United States Patent
Harrant et al.

(10) Patent No.: US 9,859,739 B2
(45) Date of Patent: Jan. 2, 2018

(54) LOAD DRIVER CIRCUIT INCLUDING LOAD MODEL PARAMETER ESTIMATION

(71) Applicant: Infineon Technologies AG, Neubiberg (DE)

(72) Inventors: Manuel Harrant, Taufkirchen (DE); Thomas Nirmaier, Munich (DE); Jerome Kirscher, Munich (DE); Georg Pelz, Ebersberg (DE)

(73) Assignee: Infineon Technologies AG, Neubiberg (DE)

( * ) Notice: Subject to any disclaimer, the term of this patent is extended or adjusted under 35 U.S.C. 154(b) by 444 days.

(21) Appl. No.: 14/516,331

(22) Filed: Oct. 16, 2014

(65) Prior Publication Data

US 2016/0109868 A1 Apr. 21, 2016

(51) Int. Cl.
| | |
|---|---|
| *G05B 19/042* | (2006.01) |
| *H02J 7/00* | (2006.01) |
| *H02P 23/00* | (2016.01) |
| *H02P 29/00* | (2016.01) |
| *H02M 3/00* | (2006.01) |

(52) U.S. Cl.
CPC .............. *H02J 7/007* (2013.01); *H02J 7/00* (2013.01); *H02J 7/0052* (2013.01); *H02P 23/0036* (2013.01); *G05B 19/0426* (2013.01); *H02M 3/00* (2013.01); *H02P 29/00* (2013.01)

(58) Field of Classification Search
CPC . H02J 7/007; H02J 7/00; H02J 7/0052; H02P 23/0036; H02P 29/00; H02M 3/00; G05B 19/0426
USPC ........................................................ 702/57
See application file for complete search history.

(56) References Cited

U.S. PATENT DOCUMENTS

| 4,370,098 A * | 1/1983 | McClain ............... F04B 49/065 |
| | | 417/18 |
| 2009/0176417 A1* | 7/2009 | Rembach ............... B63H 21/20 |
| | | 440/6 |

* cited by examiner

*Primary Examiner* — Mohamed Charioui
(74) *Attorney, Agent, or Firm* — Shumaker & Sieffert, P.A.

(57) ABSTRACT

A load driver circuit for driving an electric or electronic load is described. In accordance with one example, a circuit includes a power supply circuit operably coupled to the load and configured to provide a load current operably passing through the load in accordance with at least one control signal. A measurement circuit is coupled to the power supply circuit or the load and configured to measure, during operation of the load, at least one operation parameter of the load. A signal processing circuit receives the at least one operation parameter measured by the measurement circuit and is configured to estimate, based on the at least one operation parameter and a parametric model that characterizes the load, one or more model parameters of the parametric model.

18 Claims, 4 Drawing Sheets

LOAD DRIVER CIRCUIT INCLUDING LOAD MODEL PARAMETER ESTIMATION

TECHNICAL FIELD

Embodiments of the present disclosure relate to the driver circuits for driving electric loads such as, for example, such as electric motors, light bulbs and other illumination devices, glow plugs, airbag squibs, batteries to be charged and various other electric (including electronic, electromechanical and electrochemical) devices.

BACKGROUND

Today so-called "smart power devices" are increasingly used. A smart power device, in some applications also called "intelligent power switch" (IPS) or "intelligent power module" (IPM) usually includes power electronics for controlling the power supply of an electric or electronic load as well as additional circuitry which are used for monitoring and/or controlling the operation of the load, which may include protecting the load against overload or overtemperature conditions. As all those devices (smart power devices, IPM, IPS and similar) are used to drive at least one electric load such devices are generally referred to as load drivers as load driver circuits. In this context the term electric loads includes any device which needs an power (voltage and current) supply to be operated, including electromechanical devices (such as electric motors), electrochemical devices such as a battery as well as ohmic, inductive or capacitive loads (or a combination thereof).

As mentioned load driver circuits may include circuitry for controlling the power supply (load current and operating voltage) provided to a load. In a simple example such circuitry for controlling the power supply includes a single transistor such as a MOSFET. However, more sophisticated circuitry may be used such as transistor half-bridges or transistor H-bridges. Furthermore, a load driver circuit may include further a measurement circuit, which may be used to measure one or more operation parameters of the load such as load current, maximum load current, average load current, switching frequency, operation voltage, temperature or any other desired operation parameter of the load or of the driver circuit itself. The load driver circuit may also include a control circuit which may be, for example, configured to perform general control functions such as rotation speed control in case the load is an electric motor or the control of a battery charging process (e.g. of a lithium-ion battery cell of an electric or hybrid-electric vehicle). In many applications these control functions include protection functions such as over-voltage or over-temperature protection or other security relevant functions. In the mentioned example, in which the load is a rechargeable battery, these control functions are typically included in a so-called battery management system.

The performance of the mentioned control functions may depend on device specific parameters of the load such as thresholds for current limitation, armature circuit resistance in case of an electric motor, internal resistance of a battery being charged, etc. However, these device-specific parameters of the load are a priori unknown and thus the smart power device, which includes the load driver circuit, is usually designed for a broad range of different products, which might be operated using the smart power device. Furthermore, at least some device-specific parameters of the load may change over time due to aging effects. As a result, optimization with regard of the operation of a specific electric device used as load is not readily feasible.

SUMMARY

A load driver circuit for driving an electric or electronic load is described. In accordance with one example, the circuit includes a power supply circuit operably coupled to the load and configured to provide a load current operably passing through the load in accordance with at least one control signal. A measurement circuit is coupled to the power supply circuit or the load and configured to measure, during operation of the load, at least one operation parameter of the load. A signal processing circuit receives the at least one operation parameter measured by the measurement circuit and is configured to estimate, based on the at least one operation parameter and a parametric model that characterizes the load, one or more model parameters of the parametric model.

Furthermore, a method for driving a load is described. In accordance with one example, a method includes providing a load current, which passes through the load in accordance with at least one control signal, and measuring, during operation of the load, at least one operation parameter of the load. The method further includes the estimating, based on the at least one operation parameter and a parametric model that characterizes the load, one or more model parameters of the model.

Moreover, a battery management circuit for controlling the charging or discharging process of a battery is described. In accordance with one example, the battery management circuit includes a power supply circuit operably coupled to the at least one battery cell and configured to provide a load current to the battery in order to charge or discharge the at least one battery cell. The battery management circuit further includes a measurement circuit coupled to the power supply circuit or the at least one battery cell and configured to measure, during charging or discharging of the load, at least one operation parameter of the at least one battery cell. A signal processing circuit receives the at least one operation parameter measured by the measurement circuit and is configured to estimate, based on the at least one operation parameter and a parametric model that characterizes the at least one battery cell, one or more model parameters of the model.

Those skilled in the art will recognize additional features and advantages upon reading the following detailed description, and upon viewing the accompanying drawings.

BRIEF DESCRIPTION OF THE DRAWINGS

The techniques and devices of this disclosure can be better understood with reference to the following description and drawings. The components in the figures are not necessarily to scale, emphasis instead being placed upon illustrating the principles of this disclosure. Moreover, like reference numerals in the figures designate corresponding parts. In the drawings.

DETAILED DESCRIPTION

In the following detailed description, reference is made to the accompanying drawings. The drawings form a part of the description and by way of illustration show specific examples, in which the techniques or devices of this disclosure may be practiced. It is to be understood that the features of the various embodiments described herein may be combined with each other, unless specifically noted otherwise.

Figure 1:
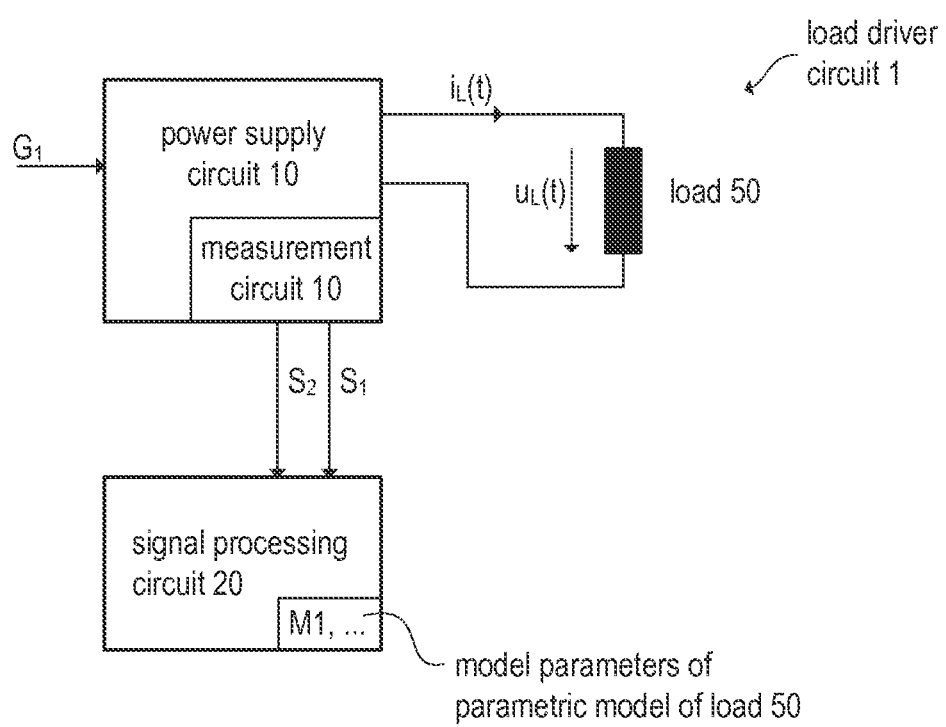
FIG. 1 illustrates a block diagram of a load driver in accordance with one example of the present disclosure connected to a load.

FIG. 1 is a circuit diagram illustrating a load driver circuit 1 in accordance with one example of this disclosure. Generally, the load driver circuit 1 includes, as a power supply circuit, a switching circuit 10, which can be coupled to a load 50. The switching circuit 10 is configured to supply electrical power to the load 50 and to switch a load current $i_L(t)$, which passes through the load 50 during operation of the load 50, on and off in accordance with at least one control signal $G_1$, $G_2$, etc. The voltage applied to the load is referred to as operation voltage $u_L(t)$. Both, load current $i_L(t)$ and operation voltage $u_L(t)$ may be time-dependent (time t). The load driver circuit 1 further includes a measurement circuit 15 (not shown in FIG. 1), which is connected to the switching circuit 10 or the load 50 (or both). The measurement circuit 15 is configured to measure, during operation of the load, at least one operation parameter $S_1$, $S_2$, etc, of the load. Examples for an operation parameters are, inter alia, load current $i_L$, operation voltage $u_L$, rotational speed (in case the load is an electric motor), voltage or current gradients, etc. Generally, the operation parameter(s) represent(s) the operational state of the load 50. The load driver circuit further includes a signal processing circuit 20 that receives measured operation parameter(s) $S_1$, $S_2$, etc., and is configured to estimate one or more model parameters $M_1$, $M_2$, etc., that characterize a parametric model, which represents the load. The estimation is performed by the signal processing unit 20 based on the measured operation parameter(s) $S_1$, $S_2$, etc., and the parametric model.

The switching circuit 10 may include one or more semiconductor switches. In a simple example, the switching circuit 10 may include a single transistor. A free-wheeling diode may also be included. In more complex examples, the switching circuit includes a transistor half-bride. Particularly for driving electric motors, the switching circuit 10 may include a transistor H-bridge. In many applications the transistors may be implemented as MOS transistors (MOSFETS or IGBTs). However, other types of transistors may be used. Furthermore, the switching circuit may be a more complex circuitry, e.g. a so-called system-on-a-chip (SOC) or a system-in package (SiP), which may include a digital interface (e.g. a serial peripheral interface, SPI or similar), for example a squib driver used for airbag deployment or a switching power converter.

In a simple example, the measurement circuit 15 may be composed of a single measurement resistor (see also FIG. 3) for measuring the load current. However, more sophisticated circuits may be used for current measurements such as so-called sense transistors coupled in parallel to load transistors, which switch the load current.

The parametric model may represent a dynamic system, particularly (as an approximation) a linear time-invariant (LTI) system. However, the present description is not limited to time-invariant systems. In a case, in which the load 50 is, for example, essentially behaves like an inductor, the parametric model may be a first order differential equation, that is:

$$u_L = L \cdot \frac{di_L}{dt} + R_S \cdot i_L. \tag{1}$$

In general terms, equation 1 may be written as $$S_1 = M_1 \cdot S_3 + M_2 \cdot S_2, \tag{2}$$

wherein, in the mentioned case (load behaves like an inductor) the operation parameters are operation voltage $u_L$ (operation parameter $S_1$ in equation 2), load current $i_L$ (operation parameter $S_2$ in equation 2), and the gradient (derivation) of the load current $i_L$. These operation parameters $S_1$, $S_2$, $S_3$, represent the state of the dynamic system (represented by the parametric model). In the present example, the model parameters are the inductance L of the load 50 (model parameter $M_1$ in equation 2) and a series resistance $R_S$ of the inductance (model parameter $M_2$ in equation 2). These model parameters $M_1$, $M_2$ characterize the parametric model and thus the dynamic system itself.

As the type of the load (inductive load, capacitive load, resistive load, inductive-resistive load, light bulb, electric motor, etc.) connected to the load driver circuit is a-priori known an appropriate parametric model, which represents the load with sufficient accuracy, may be pre-selected. In case of a light bulb, which is a resistive, temperature dependent load, the parametric model may generally written as:

$$R_0 = f(u_L, i_{MAX}), R_{NOM} = f(u_L, i_L) \tag{3}$$

wherein model parameter $R_0$ is the initial (low) resistance of the light bulb at a ambient (room) temperature. The current $i_{MAX}$ represents the peak current (maximum current) at the moment when switching the bulb on, and $i_L$ and $u_L$ represent the load current during operation (after the start-up phase) and operation voltage. The model parameter $R_{NOM}$ is the (higher) static resistance during operation when the light bulb is hot and at its operation temperature. In this example, $i_L$, $u_L$ and $i_{MAX}$ are measured operation parameters, whereas $R_0$ and $R_{NOM}$ are model parameters to be estimated. In case of a capacitive load (capacitance C), the parametric model may be written as:

$$C = f(u_L, \int i_L dt) \tag{4}$$

wherein the operation voltage $u_L$ and the integrated load current $i_L$ are operation parameters and C is a model parameter. In case of an inductive load (inductance L without a series resistance) the parametric model may written as:

$$L = f\left(u_L, \frac{di_L}{dt}\right), \tag{5}$$

wherein the operation voltage $u_L$ and the gradient $di_L/dt$ of the load current $i_L$ are operation parameters and L is a model parameter. Combinations of the models of equations 3 to 5 may be used. Dependent on the actual system, more sophisticated parametric models may be used to represent the load. The model parameters $M_1$, $M_2$, etc., may be stored in an internal memory of the signal processing circuit 20. Alternatively, or additionally, an external memory 16 may be used to store one or more parametric models and associated model parameter values. A number of parametric models may be stored in the memory 16, wherein each parametric model stored in the memory may be associated with a specific class of loads (electric motors, light bulbs, battery cells, inductive loads, etc.). At startup of the load driver circuit, one of the stored parametric models may be selected, which appropriately models the connected load. During operation the selected parametric model is used for estimating the respective model parameters.

Figure 2:
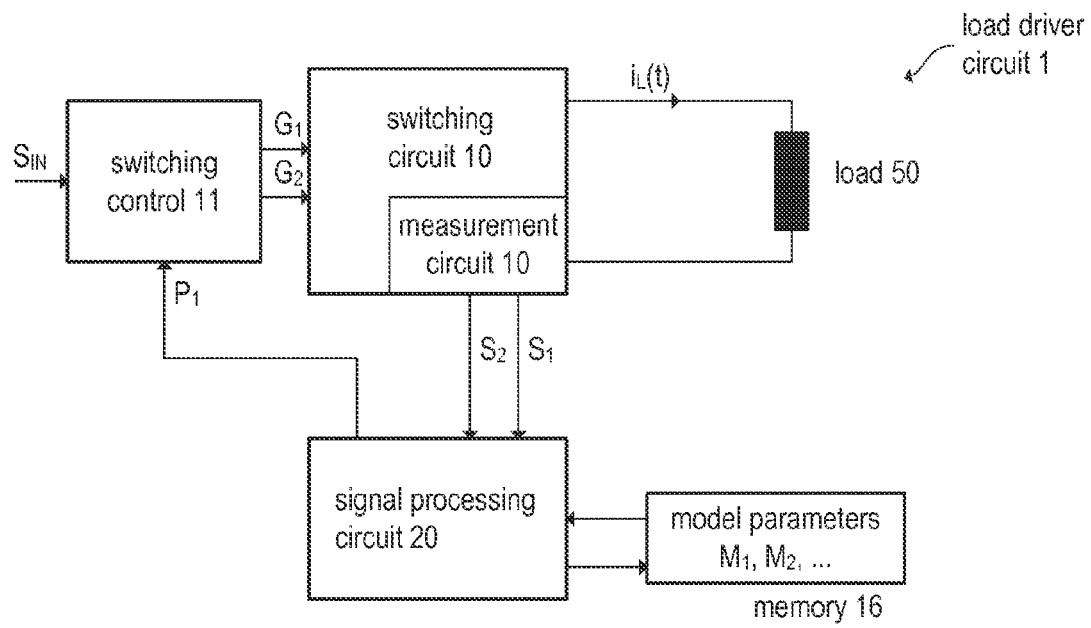
FIG. 2 illustrates a block diagram of a load driver in accordance with another example of the present disclosure connected to a load.

The control signal(s) $G_1$, $G_2$, etc., mentioned above may be provided by a control circuit 11, which controls the switching operation of the switching circuit 10. FIG. 2 illustrates a control circuit 11, which receives an input signal $S_{IN}$ (e.g., from an external controller) and provides one or more control signals $G_1$, $G_2$, etc, to the switching circuit 10. The control signals $G_1$, $G_2$, etc, are generated in response to the input signal $S_{IN}$. Furthermore, the control signals $G_1$, $G_2$, etc, may depend on at least one control parameter $R_1$, $P_2$. A control parameter are used (besides the input signal) in generating the control signals $G_1$, $G_2$, etc, which are supplied to the switching circuit 10. In one example, a control parameter $P_1$ may represent a maximum load current value in order to provide a current limitation.

In a simple example, in which the switching circuit 10 includes only one MOS transistor, a single control signal $G_1$ may be sufficient for charging and discharging a gate electrode of the MOS transistor to switch it on and off. In this case the control signal $G_1$ may be a gate current or gate voltage applied to the transistor. In case of a more complex switching circuit, more control signals may be necessary. The switching circuit 10 and the measurement circuit 15 shown in FIG. 2 are identical to the previous example of FIG. 1. As mentioned above, the switching circuit 10 may include a digital communication interface to receive control commands coded in the control signals. Examples for such digital communication interfaces are serial peripheral interface (SPI), MicroSecond Channel (MSC), I²C bus interface, universal serial bus (USB) or the like. In this cases the control signal(s) $G_1$, $G_2$, etc. are digital signals compliant with the communication standard used the communication interface.

The signal processing circuit 20 is configured to estimate model parameters $M_1$, $M_2$, etc., of a parametric model, which characterizes the load 50 as discussed above with reference to FIG. 1. In the present example, the signal processing unit 20 is further configured to calculate, based on the estimated model parameter(s) M1, $M_2$, etc., an updated value of at least one of the control parameter(s) $P_1$, $P_2$, etc. Referring to the mentioned example, according to which one control parameter $P_1$ represents a maximum load current value, the maximum load current value used as threshold for current limitation may be dynamically adjusted based on the estimated model parameters M1, M2, etc., associated with the load actually connected to the load driver circuit 1.

Other control parameters $P_1$, $P_2$, etc., may be used (and dynamically adjusted) additionally or alternatively to a maximum load current value (threshold for current limitation). When using transistors half-bridges or H-bridges a blanking time between switch-off of a high side transistor and subsequent switch-on of a low-side transistor (and vice versa) may be a relevant control parameter. Adjusting the blanking time used to operate a transistor H-bridge is one example of tuning the performance of a smart power device (i.e. the load driver circuit) based on estimated model parameters of the load driven by the smart power device. A switching circuit including a transistor H-bridge is illustrated in FIG. 3.

Figure 3:
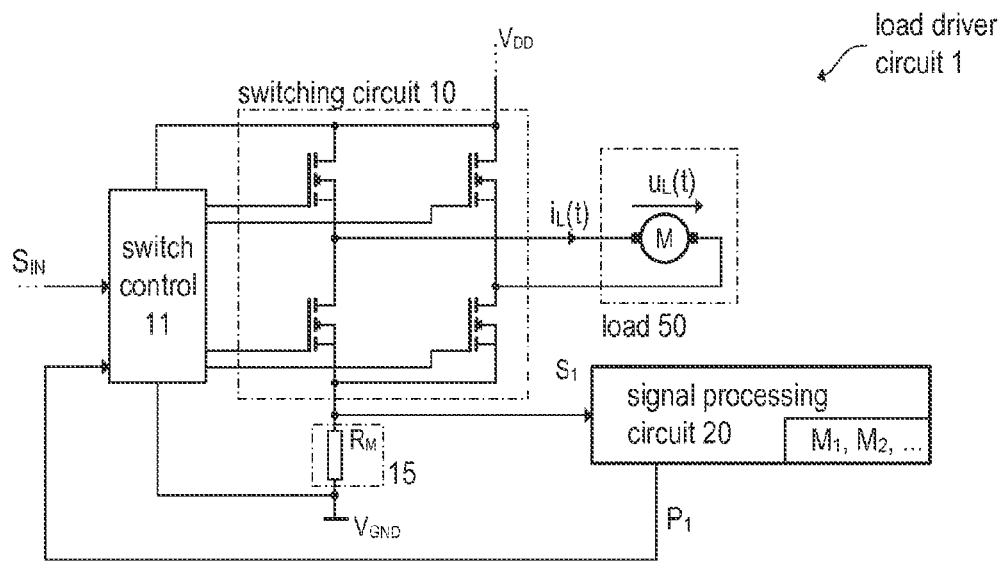
FIG. 3 illustrates a circuit diagram of a load driver in accordance with another example of the present disclosure, wherein the load is an electric motor.

FIG. 3 illustrates one example, in which load 50 is an electric motor (DC motor). In the present example, the switching circuit 10 includes a transistor H-bridge which is composed of two transistor half-bridge. Each half-bridge includes a high-side transistor and a low-side transistor, which are connected at an output node of the half-bridge. Accordingly, the H-bridge has two output nodes (one in each half-bridge) connected to the electric motor. A measurement circuit 15 is connected to the switching circuit 10 (i.e. the H-bridge) to measure the load current $i_L$ passing through the electric motor 50. In the present example, the measurement circuit 15 is a simple current measurement resistor $R_M$, which is connected between the low side transistors of the H-bridge and ground potential. The voltage drop across the resistor $R_M$ is proportional to the load current $i_L$. In the example of FIG. 3, the voltage drop across resistor $R_M$ is supplied to the signal processing unit 20 as first operation parameter $S_1$ of the electric motor 50. It is understood that the current measurement circuit 12 can be implemented in various different ways (e.g. by using pairs of power transistors and sense-transistors). Many smart power devices include switching and measurement circuit in one single chip and provide, for example, a load current measurement signal at a so-called sense pin (or diagnosis pin) of the device. Other operation parameters may also be measured such as, for example, the angular speed of the electric motor.

As in the previous example, the operation of the switching circuit 10 is controlled by a control circuit 11. Accordingly, the control circuit is configured to generate control signals $G_1$, $G_2$, $G_3$, $G_4$ in response to an input signal $S_{IN}$ for controlling the operation of the switching circuit 10; in the present example, the control signals $G_1$, $G_2$, $G_3$, $G_4$ are gate signals supplied to the gates of the four transistors in the H-bridge. The control signals $G_1$, $G_2$, $G_3$, $G_4$ may also depend on one or more control parameter $P_1$, which may be provided by the signal processing circuit 20. The control parameter(s) determine the control behavior of the control circuit. For example, one of the control parameters may be a current threshold defining a maximum load current. Using this threshold, the control circuit may perform an over-current limitation or an over-current shutdown in case the current load current exceeds the threshold. However, another control parameter may be used to determine the blanking time between the switch-off of a high-side transistor and the subsequent switch-on of a low-side transistor (or vice versa) in one of the half-bridges, which form the H-bridge. Further control parameters may be the time constant of a controller used to implement an angular speed control. The input signal $S_{IN}$ may be a simple binary signal (to switch the load on and off). However, a digital signal composed of more than one bit or an analog signal may also be used as input signal $S_{IN}$, e.g. to define a set-point for an angular speed controller included in the control circuit. In a battery charging application, the load 50 may be a (e.g. lithium-ion) battery cell, wherein two or more cells may be combined to a battery-stack. As mentioned the estimated model parameter $M_1$ may be the internal resistance of the battery cell. On the basis of this estimated model parameter $M_1$ (which may be estimated and updated regularly) the voltage drop across the battery cell during charging/discharging of the cell can be calculated and used by the control circuit 11 as control parameter $P_1$ to control the charging/discharging process.

Figure 4:
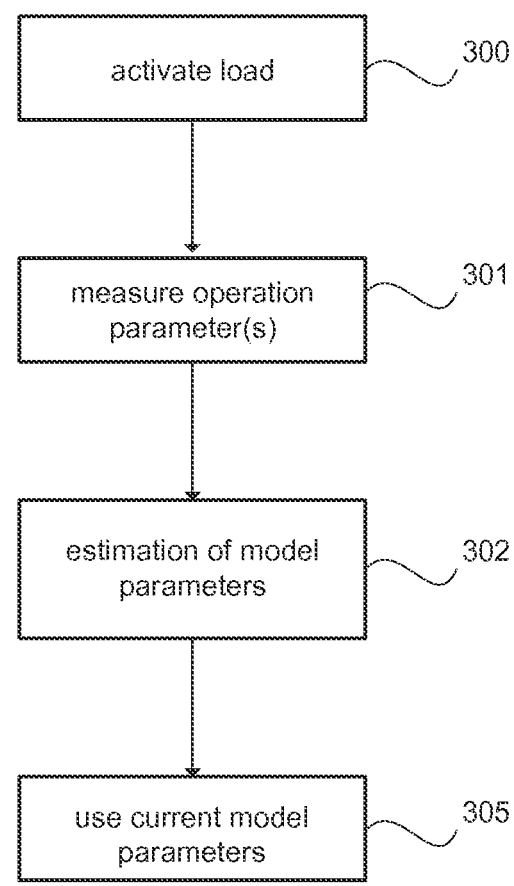
FIG. 4 is a flow chart of one exemplary method, which may be performed by the embodiments of FIG. 1, 2 or 3.
Figure 5:
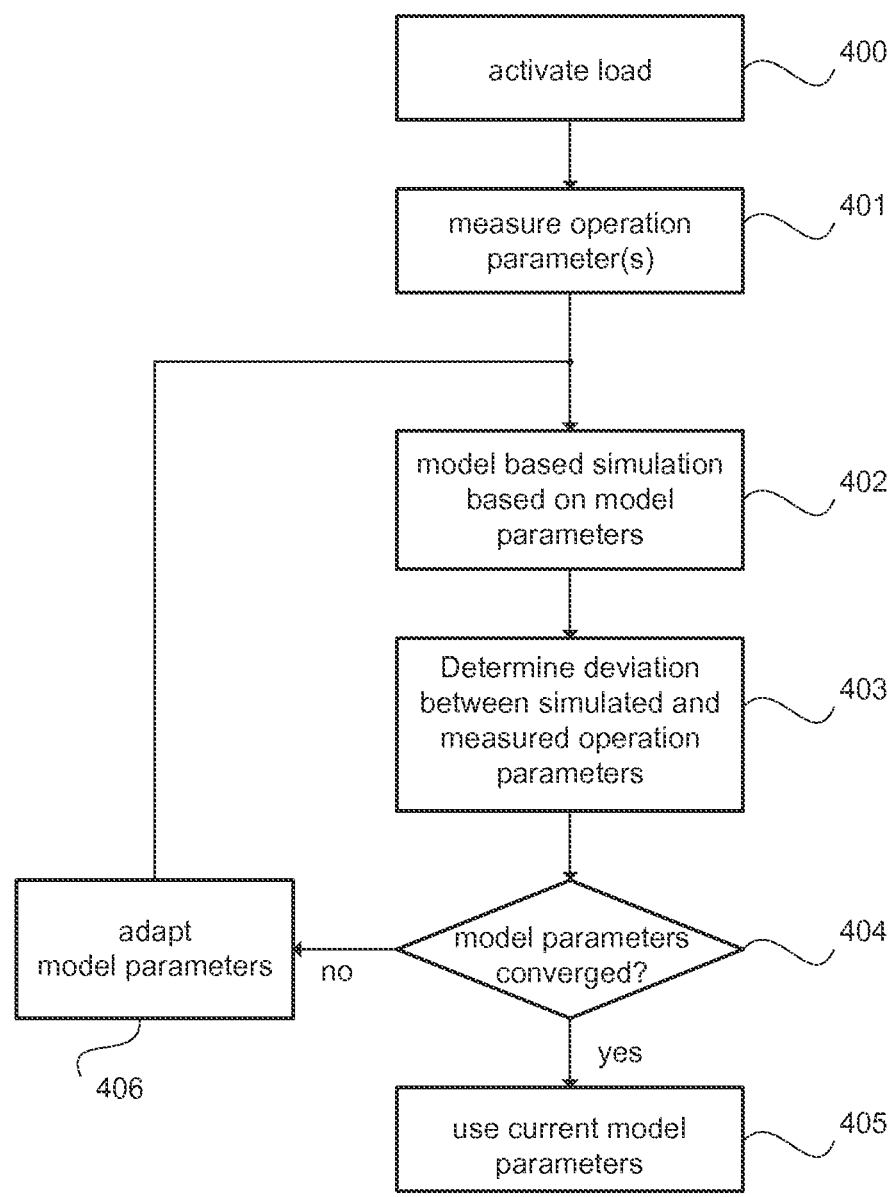
FIG. 5 is a flow chart of another exemplary method, which may be performed by the embodiments of FIG. 1, 2 or 3.

As mentioned above, the signal processing unit 20 is configured to process the measured operation parameters $S_1$, $S_2$, etc. of the load in order to one or more estimate model parameters $M_1$, $M_2$, etc. which characterize the actual load operated with the load driver circuit. Examples of how model parameters may be calculated during operation of a load are illustrated in FIGS. 4 and 5. Referring to FIG. 4, the operation of the load is started (step 300) in accordance with the input signal $S_{IN}$ and with previously stored nominal control parameters $P_1$ (see FIG. 2). During operation of the load, operation parameters $S_1$, $S_2$, $S_3$, etc. are measured at one or more time instants (step 301). Given a specific parametric model, with which the behavior of the load can be described with sufficient accuracy, the model parameters may be calculated (step 302) from the measured operation parameters $S_1$, $S_2$, $S_3$, etc. As a result, the model parameters of the parametric model are obtained so that they represent the actual behavior of the load 50. Subsequently, the estimated model parameters may be used (step 305) for various different purposes. In a simple example, the model parameters are monitored in order to detect changes of the electrical characteristics of the load 50 represented by the model parameters. A significant change of a model parameter may be an indicator of a fault in the load. In a more sophisticated example, updated values for at least one control parameter $P_1$, $P_2$, etc., may be derived from the model parameters. The updated values are provided to the control circuit 11, which then adapts its control behavior by updating the control parameters $P_1$, $P_2$, etc.

FIG. 5 illustrates one example of model parameter estimation in more detail. Like in the previous example, the operation of the load is started (step 400) in accordance with the input signal $S_{IN}$ and with previously stored nominal control parameters $P_1$ (see FIG. 2). During operation of the load, operation parameters $S_1$, $S_2$, $S_3$, etc. are measured at one or more time instants (step 401). Given a specific parametric model, with which the behavior of the load can be described with sufficient accuracy, some of the operation parameters can be simulated using the parametric model and initial (nominal) values of model parameters (step 402). Subsequently, the simulated (i.e. calculated by the signal processing circuit based on the parametric model of the load and the current model parameters) operation parameters (e.g., simulated load current) are compared with the corresponding measured operation parameters (e.g. measured load current) and the deviation between simulated and measured values is determined (step 403). If measured and simulated values match with sufficient accuracy, convergence of the model parameters (step 404) is detected, and the current model parameters may be used for further processing as mentioned above (step 405). If measured and simulated values do not match with sufficient accuracy, the model parameters are adjusted (step 406) and a new simulation (step 402) is triggered with the adjusted model parameters. This loop (simulation, determining simulated and measured values, and adjusting model parameters) is repeated until the model parameters converge to their true value and the simulated and measured values match.

Although various exemplary embodiments of this disclosure have been disclosed, it will be apparent to those skilled in the art that various changes and modifications can be made which will achieve some of the advantages of this disclosure without departing from the spirit and scope of this disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of this disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the scope of the inventions described herein is not limited by the foregoing description, nor is it limited by the accompanying drawings. Instead, the scope of the inventions described herein is limited only by the following claims and their legal equivalents.

We claim:

1. A load driver circuit for driving a load comprising:
    a power supply circuit operably coupled to the load and configured to provide a load current operably passing through the load in accordance with at least one control signal;
    a measurement circuit coupled to the power supply circuit or the load and configured to measure, during operation of the load, at least one operation parameter of the load;
    a signal processing circuit that receives the at least one operation parameter measured by the measurement circuit and configured to estimate, based on the at least one operation parameter and a parametric model that characterizes the load, one or more model parameters of the parametric model;
    a control circuit coupled to the power supply circuit and configured to provide the at least one control signal in response to at least one input signal and one or more control parameter(s), wherein:
        the signal processing circuit is further configured to calculate, based on the estimated model parameter(s), an updated value of at least one of the control parameter(s)
        the control circuit is further configured to adapt a control behavior in response to the updated value of the at least one control parameter(s).

2. The load driver circuit of claim 1, wherein the power supply circuit includes a switching circuit configured to switch the load current operably passing through the load on and off in accordance with the at least one control signal.

3. The load driver circuit of claim 2,
    wherein the switching circuit and the signal processing circuit are integrated in a single semiconductor chip or a single chip package.

4. The load driver circuit of claim 1,
    wherein the signal processing unit includes or is coupled to a memory for storing a number of parametric models, each parametric model being associated with a specific class of loads.

5. The load driver circuit of claim 4,
wherein the signal processing unit receives a select signal for selecting one of the stored parametric models, and
wherein estimating one or more model parameters is based on a selected one of the parametric model.

6. The load driver circuit of claim 1,
wherein the load is an electric motor, and
wherein the at least one operation parameter of the load includes at least one of the following: a load current supplied to the load via the power supply circuit, a gradient of the load current, an angular speed of the electric motor, and an angular acceleration of the electric motor.

7. The load driver circuit of claim 6,
wherein the model parameters include at least one of: an armature circuit resistance of the electric motor, an armature circuit inductance of the electric motor, the motor velocity constant of the electric motor, the damping constant of the electric motor and the moment of inertia of the armature of the electric motor.

8. The load driver circuit of claim 1,
wherein the control parameter(s) include a current limitation value.

9. The load driver circuit of claim 1,
wherein the at least one operation parameter of the load includes at least a load current supplied to the load via the power supply circuit or an operation voltage applied to the load by the power supply circuit or both.

10. The load driver circuit of claim 1,
wherein the load is a battery comprising at least one battery cell.

11. A method for driving a load, the method comprising:
generating, by a control circuit, at least one control signal in response to at least one input signal and one or more control parameter(s);
providing a load current passing through the load in accordance with the at least one control signal;
measuring, during operation of the load, at least one operation parameter of the load;
estimating, based on the at least one operation parameter and a parametric model that characterizes the load, one or more model parameters of the model;
calculating, based on the estimated model parameter(s), an updated value of at least one of the control parameter(s) and
in response to the updated value of the at least one control parameter(s), adapting a control behavior of the control circuit.

12. The method of claim 11, further comprising:
storing a number of parametric models in a memory, each parametric model being associated with a specific class of loads.

13. The method of claim 12, further comprising
selecting one of the stored parametric models, and
using a selected one of the parametric model for estimating one or more model parameters.

14. The method of claim 11,
wherein the load is an electric motor and
wherein the at least one operation parameter of the load includes at least one of the following: a load current provided to the load via, a gradient of the load current, an angular speed of the electric motor, and an angular acceleration of the electric motor.

15. The method of claim 14,
wherein the model parameters include at least one of: an armature circuit resistance of the electric motor, an armature circuit inductance of the electric motor, the motor velocity constant of the electric motor, the damping constant of the electric motor and the moment of inertia of the armature of the electric motor.

16. The method of claim 11, wherein providing a load current passing through the load includes:
switching a load current passing through the load on and off in accordance with at least one control signal.

17. The method of claim 11,
wherein the control parameter(s) include a current limitation value.

18. The method of claim 11,
wherein the at least one operation parameter of the load includes at least a load current supplied to the load or an operation voltage applied to the load or both.

* * * * *